March 24, 1959     C. W. CLINE     2,878,639

DETACHABLE LAZY TONGS LINKAGE

Filed Aug. 7, 1956

Cecil W. Cline
INVENTOR.

BY *(signatures)*
           Attorneys

United States Patent Office 2,878,639
Patented Mar. 24, 1959

2,878,639

DETACHABLE LAZY TONGS LINKAGE

Cecil W. Cline, Baton Rouge, La.

Application August 7, 1956, Serial No. 602,624

2 Claims. (Cl. 59—79)

The present invention relates to expansion bands used as bracelets, watch bands, belts and the like and it has reference, more particularly stated, to an improved joint or articulation between the outer ends of the paired links of lazy-tongs-type linkage customarily and currently used in the stated bands.

As will be no doubt evident from the preceding general statement of the nature of the concept, expansion bands in vogue utilize lazy-tongs-type linkage which, as usual, is characterized by pairs of companion rigid links which are spring-biased to assume normally contracted positions and which have overlapped central portions pivotally joined. The outer ends of cooperating or adjacent links are also pivotally or hingedly connected in one manner or another. Most improvements in linkage structures in this category have to do with varying forms of hinge-joints. So, it is the obvious objective here to appropriate a hinge-joint which is not only mechanically simple and expedient but is highly desirable in that it allows the normally hinged overlapping outer ends of the links to be connected and disconnected to take care of repairs and to adjust the band to meet the requirements of large and small sizes.

Another object of the invention is to structurally, functionally and otherwise improve upon similarly constructed and performing link joints and, in so doing, to provide a construction which will fulfill the needs of purchasers and users but will, more importantly, appeal to manufacturers because of the manufacturing advantages and economies involved and, what is still more important, will serve the needs of jewelers and watchmakers.

Briefly summarized, the invention therefore has to do with expansible and contractible spring-biased linkage of the lazy-tongs-type embodying pairs of companion links having their central portions superimposed and pivotally connected for expansible and contractible cooperation, and means hingedly and separably adjoining the respective outer ends of adjacent cooperating links, said means in each instance comprising a rigid stud carried by and lateral to the end portion of one link, a collar carried by the corresponding end portion of the companion link, said stud extending into and being encircled by said collar and providing the desired hinge-joint connection, said collar being rotatable relative to said stud, said collar and stud having coacting relatively adjustable elements which normally cooperate to retain the collar and stud in interconnected hinge-joint relationship, said elements being manually regulable and mechanically positioned and shiftable to maintain the hinge-joint connection or, alternatively, to disconnect said connection so that the end portions of the links may be wholly parted or joined as the case may be.

Other objects, features and advantages will become more readily apparent from the following description and the accompanying sheet of illustrative, but not restrictive, drawings.

In the accompanying drawings, wherein like numerals are employed to designate like parts throughout the views.

Figure 1:
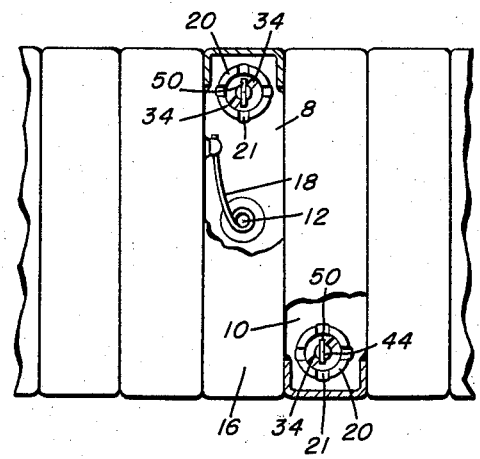
Fig. 1 is a top plan view of a fragmentary portion of an expansion-type watch band, with portions broken away and appearing in section, and disclosing the improved hinge-joint construction.
Figure 2:
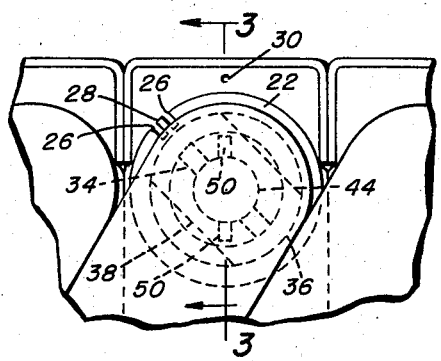
Fig. 2 is a reverse view which may be said to be of the interior of the band and exaggerated and showing a single hinge-joint and its construction and mode of use.
Figure 4:
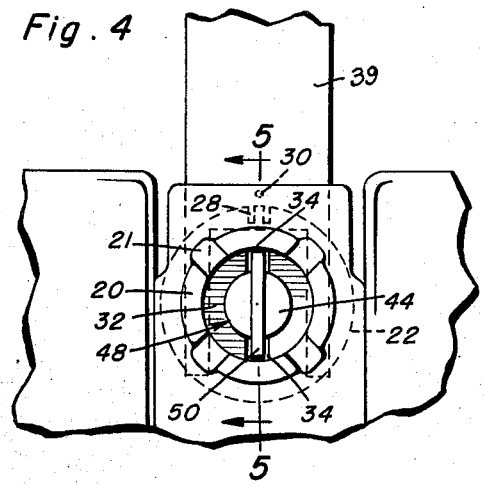
Fig. 4 is an enlarged or exaggerated plan view fragmentary in form and related to Fig. 1 but showing the keeper lugs and keeper notches lined up to allow the parts of the hinge-joint to be either assembled or separated, as the case may be.
Figure 3:
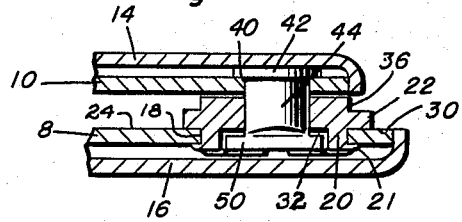
Fig. 3 is a section on the line 3—3 of Fig. 2 with the stud appearing in elevation.
Figure 5:
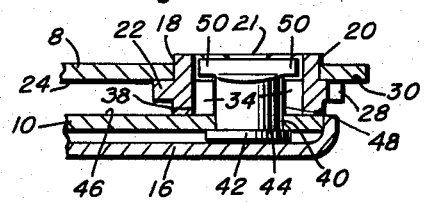
Fig. 5 is a section on the line 5—5 of Fig. 4.
Figures 6, 7:
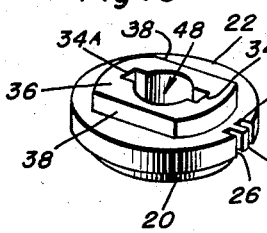
Figs. 6 and 7 are perspective views of the component herein identified as the turnable or rotatable collar.

Referring now to the drawings in detail, it will be evident that lazy-tongs-type linkage is old in the art and in referring to it here all that seems necessary is to mention two, more or less, links which are here denoted by the numerals 8 and 10 the links being hingedly or pivotally joined at their central or intermediate portions 12 where they are disposed in overlapping or superimposed relationship. As is customary the links are contained within cooperating ornamental shell complements which are denoted in Figs. 3 and 5, for example, by the numerals 14 and 16. The spring means at the center which is spring-biased and serves to close or contract the links is denoted by the numeral 18. As before mentioned, the improvement here is in the articulation or hinge-joint which is employed to interconnect the outer ends of the cooperating sets or pairs of links 8 and 10. To simplify the presentation and to focus attention on the details thereof only a single hinge-joint is stressed. Referring now to Figs. 3 and 5, it will be noticed that the outer end of the link 8 is provided with an opening or hole 18. The aforementioned sleeve-like collar 20 is situated in the hole and swivelly mounted therein. An end of the journal portion of the collar protrudes slightly beyond the surface of the link 8 and is circumferentially peened or otherwise clenched as at 21 in order to thus rotatably connect the collar to the link. The median portion of the collar is also provided with a peripheral flange 22 which abuts the surface 24 of the cooperating link 8. This flange is provided on its peripheral edge with a pair of spaced kerfs 26 defining an intervening tongue 28 which is used here as an indicator and which cooperates with a relatively fixed index point 30 which is punched or otherwise formed on the surface 24 of the link 8 in the manner shown in Figs. 2–5. The collar also has an inside flange 32 which serves as a shoulder and has diametrically opposite keeper notches 34 formed therein. These notches align with extensions of the same denoted at 34A in Fig. 6 and which are formed in a boss-like extension 36 on the stated collar. It will be noticed that diametrically opposite marginal sides of this embossment are flattened and straight as at 38 to accommodate a jeweler's wrench 39 which is employed to rotate the collar 20 in the hole 18 relative to the arm 8 in an obvious manner. It might be stated in this connection that in Fig. 4 the indicator 28 is lined up with the index point 30, this being the released or ready-to-open position. In Fig. 2 the collar has been turned so that the indicator 28 is out of line with the index 30, this being the normal or closed hinge-forming position of the parts. Referring now to the opposed and cooperating link 10 this also has a hole 40 therethrough in which the headed end 42 of a hinging pin or stud 44 is fitted. It is rigidly mounted and is disposed at right angles to the link 10 and one end portion projects beyond the surface 46 of the link 10 and passes into the bore 48 in the collar 20. It does not pass all the way through but has its retaining end more or less recessed into the space between the top edge of the collar (Fig. 5) and the top surface of the shoulder forming flange 32. This "upper" end of the stud is provided with diametrically opposite outstanding integral lugs which are here referred to as keeper lugs 50 and these are obviously constructed so that they can be slid in or out by way of the slots or keeper notches 34, 34A. Thus, the stud 44 and collar 20 may be "buckled" together to provide a hinge-joint, or they may be turned relative to each other to permit the collar and stud to be parted to disconnect the cooperating ends of the links 8 and 10 in an obvious manner. The fact is, the tool engaging boss 36 is between the surfaces 24 and 46 of the arms 8 and 10 so that it is possible for the jeweler to insert his wrench 39, catch hold of the collar 20 by way of the boss 36 and turn the collar either clockwise or counterclockwise depending on the known relationship of the index point 30 and the indicator 28. This makes it possible to properly register and disalign the coacting elements, that is, the keeper lugs 50, keeper notches 34 and 34A and shoulder forming flange 32, whereby the desired hinge-joint connection is had. Thus, a simple, practical two-part quick-separable hinge-joint is provided.

The herein revealed quick-separable joint is not meant to be a standard joint for all connections of the intermediate links band, but just at one end. In fact two joints in one band is usually sufficient to add as many links as desired. Of course, if these special extra or auxiliary links are already in band when purchased, then there will be more of my joints present. I am not concerned about the other portion of the band, such as other joints, springs, design, central cross arm, pivots, and so on. As long as it is the lazy-tong-type band, my invention can be incorporated to make it possible to readily shorten, or lengthen, by adding or removing links.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use in and as an essential part of a wrist watch expansion band and for shortening or lengthening said band; a lazy-tongs-type band embodying pairs of companion spring-biased flat-faced links having their central portions crossed and permanently pivoted connected for expansible and contractible cooperation, and quick-separable means hingedly and separably adjoining the respective outer ends of adjacent cooperating links, said means in each instance comprising a lateral rigid stud fixed to and carried by an end portion of one link, a rotatable collar carried by the corresponding end portion of a second companion link, said stud extending into and being encircled by said collar and providing the desired separable hinge-joint connection between the collar and stud, said collar being freely rotatable relative to said stud and links, said collar and stud having cooperating relatively rotatable interlocking components which normally cooperate when set by hand to retain the collar, stud, and links in interconnected hinge-joint relationship, said components being manually regulable and mechanically positioned and variable to lock and maintain the hinge-joint connection or, alternatively, positioned relative to each other in a manner to unlock said hinge-joint connection, whereby the end portions of the links may be wholly parted or joined, as the case may be, said components embodying diametrically opposite keeper-lugs fixed on the stud and confined for operation in the bore of the collar and complemental diametrically opposite keeper-lug notches provided in the bore of said collar, the component in the bore of said collar comprising a shoulder-forming-flange having a pair of diametrically opposite keeper notches and the companion components carried by said stud comprising keeper-lugs selectively cooperable with the shoulder portion of the flange or said keeper notches, whichever is called for.

2. For use in an adjustable-type wrist watch expansion band; a lazy-tongs-type band embodying spring-biased flat-faced linearly straight links having their central portions overlapped and permanently pivoted together to permit the links to open and close, there being at least two sets of pivoted links, a first link having an opening therein at the outer end of the link, a headed link connecting and hinging stud fixed to the outer end of a second link and projecting at right angles from said second link and into the space between the respective outer ends of said links, a collar swivelly mounted for rotation in the opening in said first link, the bore of said collar having an internal flange providing a smooth-surfaced shoulder confined in said bore, said flange having a pair of diametrically opposite keeper notches, said stud being removably positioned and confined in the bore of said collar and being provided at one end with diametrically opposite outstanding keeper lugs removably cooperable with said keeper notches and shiftable and adjustably cooperable with the smooth surfaces on said flange to effect a quick separable hinge-joint between the ends of said links, said collar having an assembling flange rotatably contacting the inner surface of said first link, said assembling flange being marginally provided with an indicator, said first link being provided with a stationary index with which the indicator is selectively cooperable, that portion of the collar which is between the opposed inner surfaces of said links being fashioned into a boss, and said boss having its diametrically opposite sides flattened to provide wrench-grips.

References Cited in the file of this patent

UNITED STATES PATENTS

| | | |
|---|---|---|
| 1,586,904 | Kuhn | June 1, 1926 |
| 2,225,745 | Kestenman | Dec. 24, 1940 |
| 2,249,086 | MacIntosh | July 15, 1941 |

FOREIGN PATENTS

| | | |
|---|---|---|
| 672,993 | Germany | Mar. 14, 1939 |
| 929,938 | Germany | July 7, 1955 |
| 1,107,045 | France | July 27, 1955 |